No. 849,816. PATENTED APR. 9, 1907.
I. L. SJÖSTRÖM.
TRUCK.
APPLICATION FILED SEPT. 11, 1905.

Witnesses:
H. B. Davis.
Cynthia Doyle

Inventor:
Ivar L. Sjöström
by Hoyt & Hanninan
Attys

UNITED STATES PATENT OFFICE.

IVAR L. SJÖSTRÖM, OF LAWRENCE, MASSACHUSETTS.

TRUCK.

No. 849,816.     Specification of Letters Patent.     Patented April 9, 1907.

Application filed September 11, 1905. Serial No. 277,837.

*To all whom it may concern:*

Be it known that I, IVAR L. SJÖSTRÖM, of Lawrence, county of Essex, State of Massachusetts, have invented an Improvement in Trucks, of which the following description, in connection with the accompanying drawings, is a specification, like characters on the drawings representing like parts.

This invention relates to certain improvements in trucks, and has for its object to produce a truck which is durable and simple in construction and which is especially adapted for use in mills in which it is necessary to carry cloth from one place to another before it is rolled. I accomplish these objects by providing an open-ended truck having flaring sides held in place by two or more rigid supports which extend down from the upper edge of one side, beneath the bottom, and upward to the upper edge of the other side and are rigidly secured to said sides and bottom at frequent intervals throughout their entire length.

Figure 1:
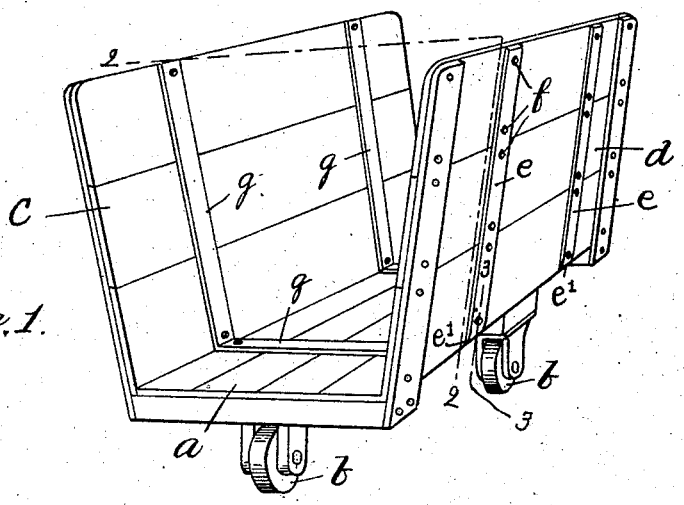
Figure 2:
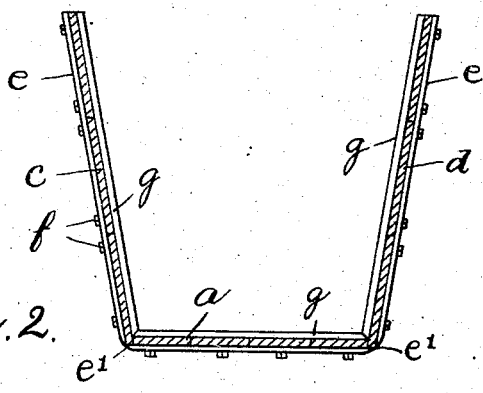
Figure 3:
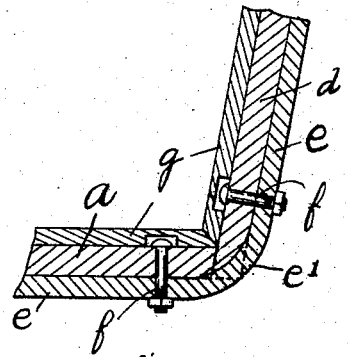

In the drawings, Figure 1 is a perspective view of a truck made according to my invention. Fig. 2 is a cross-sectional view on the line 2 2 of Fig. 1, and Fig. 3 is an enlarged detail sectional view on the line 3 3 of Fig. 1.

As shown in the drawings, the truck is open-ended and comprises a wooden bottom $a$, suitably mounted on casters $b$, and two wooden sides $c$ and $d$, which extend divergently upward from the side edges of the bottom. Any suitable or convenient form of joint may be provided between the sides and bottom, and strengthening-cleats are preferably secured to the outer surfaces of the sides adjacent each end. A pair of U-shaped supports $e$ $e$, of heavy wrought-iron, are firmly secured by bolts $f$ to the outer sides of the sides and bottom, said supports extending from points adjacent the upper edge of each side downwardly beneath the bottom. The two side sections and the bottom section of each support $e$ are straight, and the intermediate portions $e'$ $e'$ are bent on a curve, and the adjacent edge portions of the bottom and sides are cut away or recessed to receive the supports, all as indicated in Fig. 3. The bolts $f$ are preferably arranged so that their heads engage the inner surfaces of the sides of the truck, their securing-nuts bearing against the outer side of the supports $e$, and wood strips $g$ are preferably secured to the sides over the heads of said bolts.

The bolts $f$ are arranged at frequent intervals, so that the sides are firmly held against inward as well as outward movement. The supports $e$ are adapted to permit the sides to yield slightly in case they should receive a lateral strain, so that they will not sustain as severe shocks or strains as they would if held with great rigidity, and the durability of the truck is thus greatly increased. Moreover, when any strain is placed on one of the sides this strain is at once communicated to both supports and the bottom and the other side—that is, the strain is distributed throughout the whole truck so that no one portion is excessively strained, the whole truck thus being a substantially integral structure. Obviously the greatest strain on the supports comes on their curved bent portions $e'$, and as these portions are gradually curved instead of being bent at a sharp angle the strain is distributed throughout.

Having thus described my invention, what I claim as new, and desire to secure by Letters Patent, is—

A truck comprising a trough-like body entirely open at its ends and consisting of a flat wooden bottom and deep straight sides diverging upward therefrom, and external heavy semiyielding one-piece metal supports each having a central portion secured to and extending transversely across said bottom and upward-diverging side portions secured to and extending upward along said sides approximately to the tops thereof, the junctions between said central and side portions of the supports being bent on a long gentle curve overlying the junctions between the bottom and sides of the body.

In testimony whereof I have signed my name to this specification in the presence of two subscribing witnesses.

IVAR L. SJÖSTRÖM.

Witnesses:
    L. H. HARRIMAN,
    H. B. DAVIS.